United States Patent [19]
Kelly et al.

[11] Patent Number: 5,748,004
[45] Date of Patent: May 5, 1998

[54] RESET SWITCH FOR A MICROMACHINED DEVICE

[75] Inventors: Thomas W. Kelly, South Easton; John Memishian, Newton, both of Mass.

[73] Assignee: Analog Devices, Inc., Norwood, Mass.

[21] Appl. No.: 616,876

[22] Filed: Mar. 15, 1996

[51] Int. Cl.⁶ .......................... G01P 15/125; G01R 27/26
[52] U.S. Cl. .......................... 324/661; 324/662; 324/686; 73/514.32; 361/290
[58] Field of Search .......................... 324/658, 661, 324/662, 676, 679, 686; 361/277, 287, 290, 292, 296; 73/514.16, 514.32, 862.68

[56] References Cited

U.S. PATENT DOCUMENTS

| | | | |
|---|---|---|---|
| 2,968,031 | 1/1961 | Higa | 324/661 X |
| 4,736,629 | 4/1988 | Cole | 324/661 X |
| 5,325,065 | 6/1994 | Bennett et al. | 324/661 |
| 5,343,766 | 9/1994 | Lee | 73/862.61 |
| 5,345,824 | 9/1994 | Sherman et al. | 73/517 B |
| 5,612,494 | 3/1997 | Shibano | 73/514.32 |
| 5,637,798 | 6/1997 | Schatz | 73/514.32 |

OTHER PUBLICATIONS

Brodersen, R.W., and Emmons, S.P., "Noise in Buried Channel Charge–Coupled Devices", *IEEE Journal of Solid-State Circuits*, vol. SC–11, No. 1, Feb. 1976, pp. 147–155.

Furukawa, M., Hatano, and Hanihara, K., "Precision Measurement Technique of Integrated MOS Capacitor Mismatching Using a Simple On–Chip Circuit", *IEEE Transactions on Electron Devices*, vol. ED–33, No. 7., Jul. 1986, pp. 938–944.

Hsieh, K. Gray, P.R., Senderowicz, D., and Messerschmitt, D.G., "A Low–Noise Chopper–Stabilized Differential Switched–Capacitor Filtering Technique", *IEEE Journal of Solid-State Circuits*, vol. SC–16, Dec. 1981, pp. 458–465.

Iwai, H. and Kohyama, S., "On–Chip Capacitance Measurement Circuits in VSLI Structures", *IEEE Transactions on Electron Devices*, vol. ED–29, No. 10, Oct. 1982, pp. 1622–1625.

Analog Devices, Inc., 1995, Rev. 0, "±1g to ±5g Single Chip Accelerometer With Signal Conditioning" ADXL05* (month unavailable).

Analog Devices, Inc., Rev. A, "Monolighic Accelerometer With Signal Conditioning" ADXL50* (date unavailable).

*Primary Examiner*—Glenn W. Brown
*Attorney, Agent, or Firm*—Hale and Door LLP

[57] ABSTRACT

In a circuit for use with a micromachined device having a movable mass that forms an inner electrode of a differential capacitor, oppositely phased square waves are applied to two outer electrodes of the differential capacitor. A reset voltage is applied to the inner electrode synchronously with the square waves to stabilize and control the potential on the inner electrode. The signal on the inner electrode is demodulated by sampling during a first half of the square wave and a second half of the square wave between applications of the reset pulse to obtain a voltage that does not contain noise due to the reset switch.

18 Claims, 4 Drawing Sheets

5,748,004

1

RESET SWITCH FOR A MICROMACHINED DEVICE

FIELD OF THE INVENTION

This invention relates to circuitry for use with a micromachined device.

BACKGROUND OF THE INVENTION

Sensors and actuators, such as accelerometers for use in automobiles, can be formed as micromachined silicon structures. Examples of a micromachined accelerometer and of a process for fabricating such an accelerometer are provided in U.S. Pat. Nos. 5,345,824 and 5,326,726, which are incorporated herein by reference. As described in these patents, a mass is suspended in a plane over a surface and is movable along a sensitive axis. The mass has fingers that extend away from the mass in a direction transverse to the sensitive axis. Each of these fingers is between a pair of stationary fingers to form pairs of capacitors that make up a differential capacitor.

In some prior devices, equal and oppositely phased 1 MHz sine waves or square waves are applied to the stationary fingers. When the movable mass is not moved by an external force, it is centered between the stationary fingers and no signal appears on the mass; but when an external force is applied along the sensitive axis to cause the mass to move relative to the stationary fingers, the capacitances of the two capacitors change and the mass provides a signal indicating the acceleration. The signal is provided to a buffer, a synchronous switching demodulator, and an output amplifier.

For the movable mass to provide a signal proportional to the magnitude of the acceleration, it must not be tied to ground or to another constant voltage. But if the mass is left entirely floating, stray charges can accumulate on the mass and change its potential until the potential is high enough with respect to the underlying surface to cause it to be electrostatically pulled down to the surface. In the incorporated patent, to maintain the potential of the movable beam, the mass is connected into a feedback loop through a large resistor, such as 3 Mohms. While such a connection maintains the potential of the beam, the resistor adds noise that can adversely affect resolution.

SUMMARY OF THE INVENTION

The present invention includes a circuit and method for a device having one or more differential capacitors including a movable electrode between fixed electrodes. The fixed electrodes receive equal and opposite periodic signals of period T. The movable electrode receives a DC voltage through a reset switch that is activated synchronously with the periodic signals. Activation of the reset switch resets the DC voltage on the movable beam.

In preferred embodiments, the periodic signals are square waves of equal frequency and approximately equal amplitude, but 180° out of phase; the reset switch includes a transistor; and the DC voltage is the arithmetic average of the maximum and minimum voltages of the square waves. The reset switch is closed for a short duration relative to the period of the square wave, and has a period of T/2 or nT, with n a natural number. In each case, the pulse is preferably closed shortly after the square waves transition. The reset switch thus stabilizes the potential of the movable electrode.

The signal from the movable beam may be amplified and provided to a discrete time demodulator that demodulates the amplified signal and provides an output signal. The demodulator is controlled so that it samples during different half waves between activations of the reset switch to obtain a magnitude that indicates the amount of displacement of the mass, while subtracting noise that occurs when the switch opens. The demodulator thus samples so that noise sampled by opening the reset switch is subtracted out.

Other features and advantages will become apparent from the following detailed description, the drawings, and the claims.

DETAILED DESCRIPTION

Figure 1:
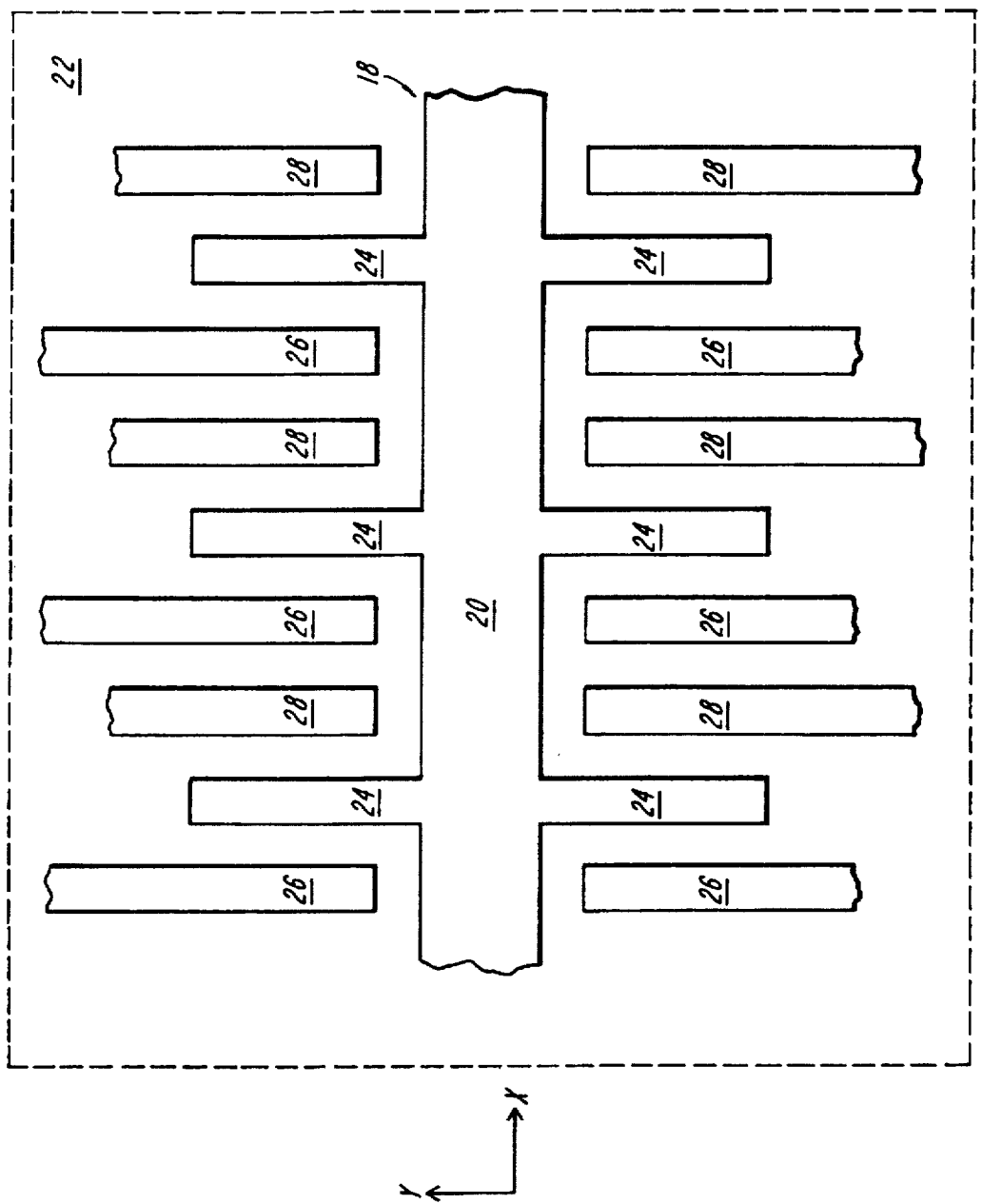
FIG. 1 is a plan view of a portion of a known micromachined sensor.

Referring to FIG. 1, the present invention is preferably used with a surface micromachined accelerometer as generally described in the incorporated patents, but can be used with differential capacitors and with micromachined differential capacitors generally. In a known example of such a device, a mass 18 is suspended in an x-y plane above and parallel to an underlying substrate 22, and is tethered to be movable along a sensitive x-axis in response to an external force applied along that axis. Mass 18 has a central beam 20 elongated along the x-axis and a plurality of movable fingers 24 extending away from either side of center beam 20 along the y-axis. Each finger 24 is centered between a first stationary finger 26 and a second stationary finger 28.

Figure 2:
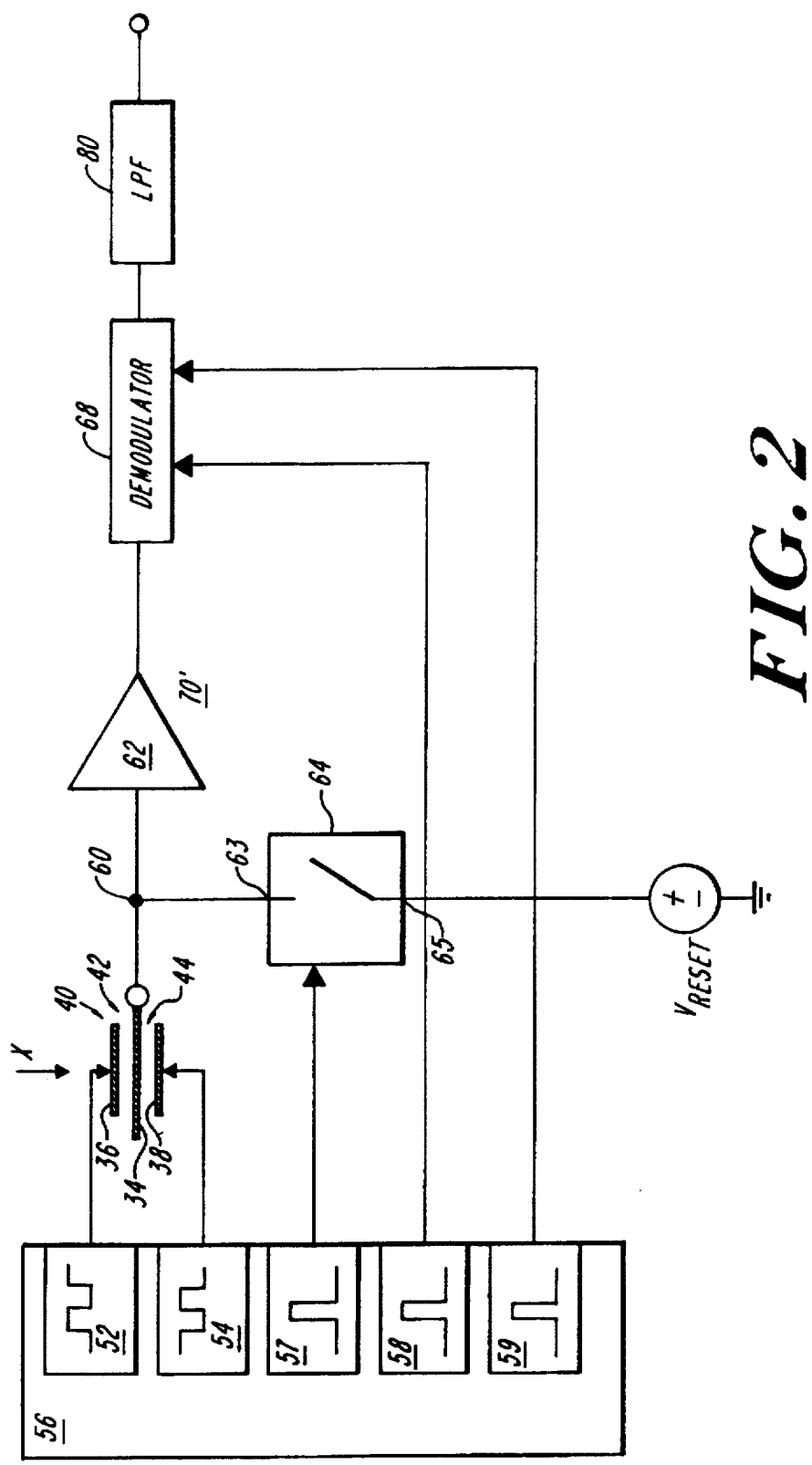
FIG. 2 is a partial block, partial schematic circuit diagram of an embodiment of the present invention.

Referring also to FIG. 2, each group of fingers 24, 26, and 28 forms a differential capacitor 40 with stationary fingers 26 and 28 serving as outer electrodes 36 and 38, and finger 24 serving as a movable inner electrode 34. Electrodes 34 and 36 form a first capacitor 42, and electrodes 34 and 38 form a second capacitor 44. Movement of mass 18 in a positive direction along the x-axis increases the capacitance of second capacitor 44 and decreases the capacitance of first capacitor 42, while movement in a negative direction along the x-axis decreases the capacitance of second capacitor 44 and increases the capacitance of first capacitor 42.

Figure 3:
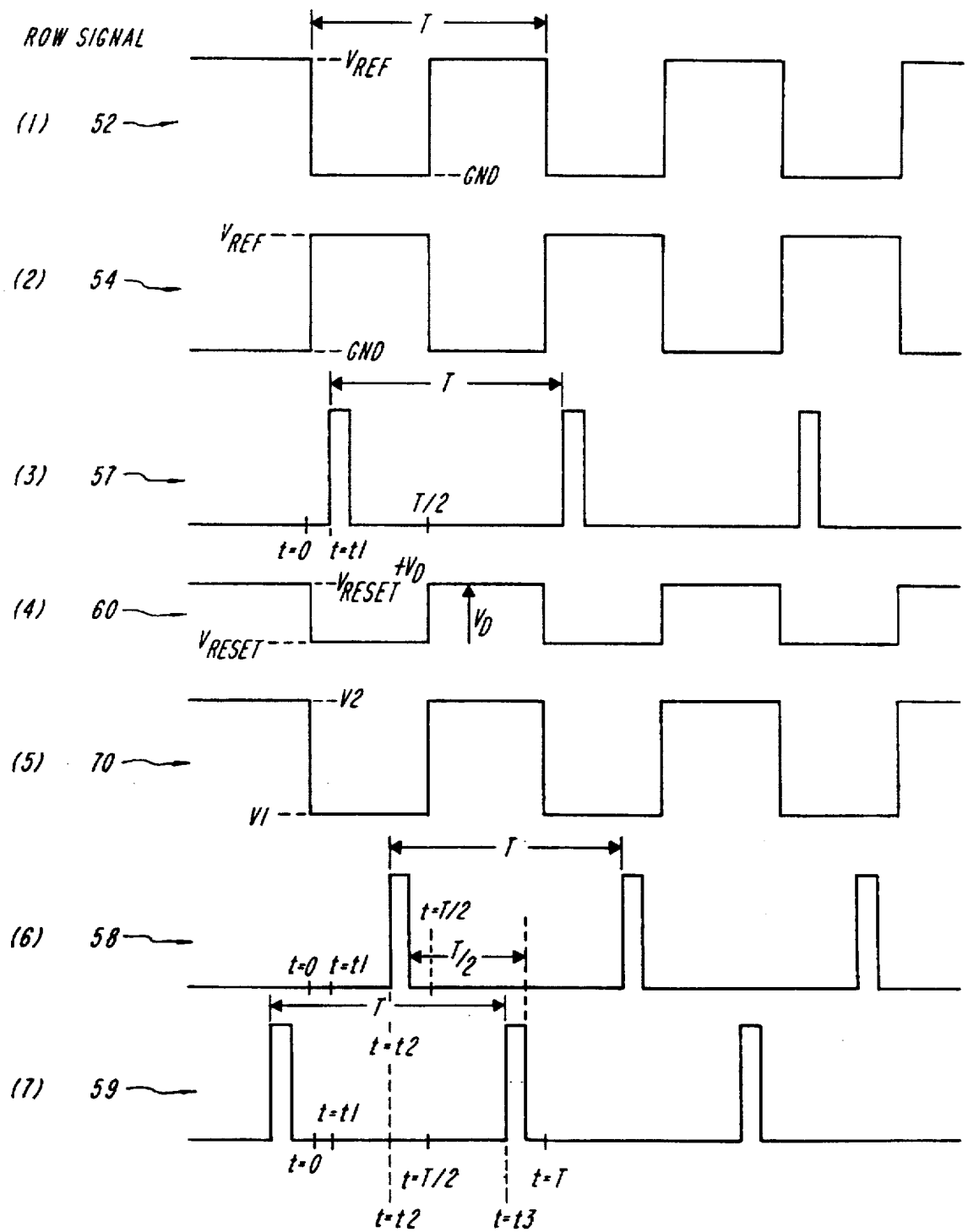
FIG. 3 is a timing diagram, illustrating the voltages at various nodes of the circuit of FIG. 2.

Referring to FIGS. 2 and 3, electrodes 36 and 38 are coupled to a signal generator 56 that provides square waves 52 and 54 to respective electrodes 36 and 38. Square waves 52 and 54 each have a period T and have equal amplitude, but each is 180 out of phase relative to the other. The square waves preferably alternate between a reference voltage $V_{REF}$ and ground (GND).

If no external force causes mass 18 to move along the x-axis, no net signal should appear on electrode 34. If, in response to an external force, mass 18 is displaced so that fingers 24 are closer to stationary fingers 26 than to stationary fingers 28, the capacitance of capacitor 42 increases and the capacitance of capacitor 44 decreases. As a result, the signal on inner electrode 34 and on a node 60 is a square wave that follows square wave 52 with a peak-to-peak voltage that is related to the displacement of mass 18. Similarly, if mass 18 is displaced so that fingers 24 are closer to stationary fingers 28 than to stationary fingers 26, the signal on inner electrode 34 on node 60 is a square wave that follows square wave 54.

Node 60 is coupled to a first port 63 of a switch 64, which can be implemented as a transistor. A second port 65 of switch 64 is connected to a reset voltage source 67 which receives a reference voltage $V_{REF}$ from generator 56 and provides a DC reset voltage $V_{RESET}$ that preferably is the arithmetic average of the minimum and maximum voltages of square waves 52 and 54, i.e., for square waves alternating between $V_{REF}$ and GND, $V_{RESET}=V_{REF}/2$.

Square waves 52, 54 and pulse signal 57, which periodically closes reset switch 64, are shown in FIG. 3. Rows 1 and 2 show square waves 52, 54, each of which alternates between about $V_{REF}$ and GND with a period T, and row 3 shows an embodiment of pulse signal 57. When signal 57 is high, reset switch 64 closes to provide $V_{RESET}$ to node 60 and thus to inner electrode 34. The pulses of signal 57 are short relative to T, are synchronous with square waves 52 and 54, and occur shortly after the square waves transition.

In this exemplary embodiment, the pulses are provided with a period T, although they can have a period of T/2 or nT. If square wave 52 goes high at t=0, a reset pulse occurs at 0<t1<T/2. Assuming no noise, the amplitude of the signal at node 60 (row 4) alternates between $V_{RESET}$ and $V_{RESET}+V_D$, with $V_D$ being a voltage indicating the displacement of electrode 34. When there is no displacement, the signal at node 60 is a constant $V_{RESET}$. The beam's potential is thus periodically returned to $V_{RESET}$ by operation of reset switch 64.

Referring again to FIG. 2, node 60 is also coupled to an AC amplifier 62 that provides an output signal 70 to a discrete time demodulator 68. Demodulator 68 translates the carrier-based signal to baseband by sampling the amplified output, preferably once during each half cycle of square waves 52 and 54, regardless of the period of reset pulse signal 57. The output of demodulator 68 may be coupled to a low-pass filter 80, which substantially blocks signals at and above the frequency of square waves 52, 54.

Referring also to FIG. 3, when there is a square wave signal at node 60, amplifier 62 amplifies this signal to increase the magnitude so that the signal alternates between voltages V1 and V2 as shown as signal 70 in row 5. Signal 70 is affected by noise, particularly kT/C noise, due to the opening of reset switch 64.

Figure 4:
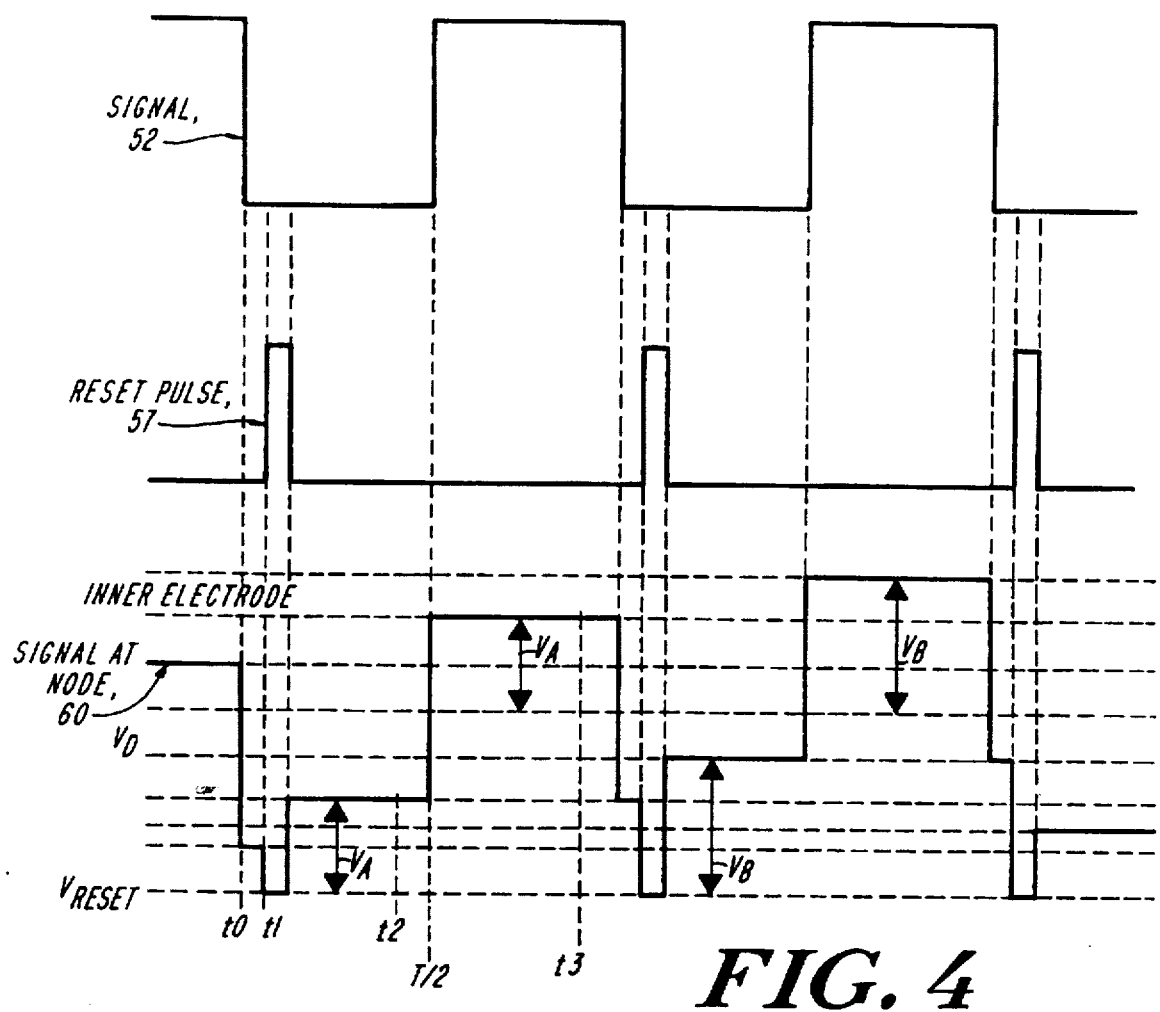
FIG. 4 is a timing diagram, illustrating the effects of noise on the voltages at various points of the circuit of FIG. 2.

Referring to FIGS. 3 and 4, by sampling each half cycle, noise signals that are the same during the half cycles are effectively subtracted out. Rows 6 and 7 of FIG. 3 show demodulator sampling signals 58 and 59 for enabling sampling by demodulator 68. As shown in row 6, first demodulator signal 58 has a period T and its pulses occur at time t2 after each reset pulse, i.e., t1<t2<T/2. The delay between times t1 and t2 is sufficient to permit the signals to stabilize. As shown in row 7, second signal 59 preferably has a period T, and provides a pulse at time t3. Signal 59 preferably also has a phase difference of T/2 relative to signal 58, i.e., T/2<t3<T, and t3=t2+T/2.

Referring to FIG. 4, when reset switch 64 is closed, the signal at node 60 is forced to $V_{RESET}$. When reset switch 64 is opened, the signal at node 60 jumps to a new level ($V_{RESET}+V_A$), with $V_A$ representing voltage added by a charge step and kT/C noise. This voltage level is read by demodulator 68 at time t2. The square waves then transition at time T/2, and the signal at node 60 increases to $V_{RESET}+V_D+V_A$, with $V_D$ being the displacement voltage and with $V_A$ unaffected by the transition at T/2. When demodulator 68 takes its second reading at time t3, the resulting difference is $V_D$, which is what the signal would have been in the absence of such noise. If during the next cycle, the effect of the noise is $V_B$, a voltage different from $V_A$, the readings remain accurate because $V_B$ is again constant for the two demodulator readings, and again the demodulator output is $V_D$.

To more precisely maintain the DC potential, the reset switch could be pulsed synchronously with signals 52, 54 every half-cycle, i.e., with a period of T/2. Such switching would not enable the rejection of noise, such as kT/C noise, however, because the errors added by these effects would change between the time that the first half wave is sampled and the time that the second half wave is sampled.

Figure 5:
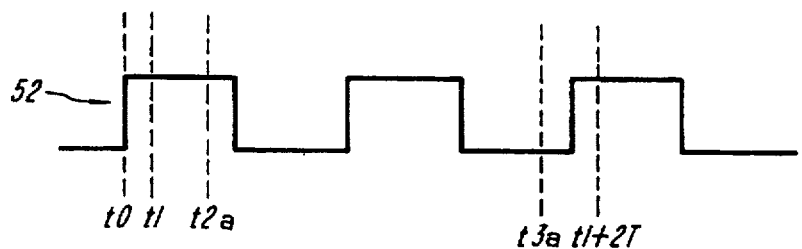
FIG. 5 is a timing diagram illustrating reset and sampling timing in an alternative embodiment.

Referring to FIG. 5, the reset switch also could alternatively be pulsed every two or more cycles or, more generally, at nT. Here, n is a natural number that is sufficiently small so that the potential of the movable beam cannot deviate too much from the desired potential. As shown in FIG. 5, with n=2, resetting is done at times t1, t1+2T, t1+4T, etc., and more generally at t1, t1+nT, t1+2nT, etc. Regardless of the period of the reset switch, however, the activation should be synchronous with the periodic signals.

As also indicated in FIG. 5, while the demodulator preferably samples every half cycle, it could sample less frequently if the reset switch closes every nT, with n>1.

To measure the signal, however, samples are taken during any is first half cycle and any second half cycle, although these samples need not be during the same cycle. As shown in FIG. 5, a first sample is taken at time t2a and a second sample is taken at time t3a, with t3a preferably at t2a+3T/2. Accordingly, to eliminate noise due to reset switch resistance, the demodulator should sample at a high value and at a low value of the square wave between closings of the reset switch.

While there have been shown and described examples of the present invention, it will be readily apparent to those skilled in the art that various changes and modifications may be made therein without departing from the scope of the invention as defined by the appended claims. While the signal generator has been shown as a single element, it can include devices working together.

What is claimed is:

1. A device comprising:
   first and second electrodes for receiving respective first and second periodic signals having equal amplitude, period T, and 180° out of phase with respect to each other;
   a movable electrode between the first and second electrodes, the first, second, and movable electrodes forming a differential capacitor with the first electrode and the movable electrode forming a first capacitor, and the second electrode and the movable electrode forming a second capacitor, the capacitances of the first and second capacitors changing in response to movement by the movable electrode;
   a DC voltage source; and
   a reset switch having a first port coupled to the DC voltage source, a second port coupled to the movable electrode, and a control port responsive to a reset signal for periodically closing the reset X switch synchronously with the periodic signals so that the DC voltage source resets the DC voltage on the movable electrode when the reset switch is closed.

2. The device of claim 1, wherein the device is a surface micromachined accelerometer having a movable mass with a beam extending along a sensitive axis and a plurality of movable fingers substantially transverse to the sensitive axis and movable with the movable mass the movable fingers forming a plurality of movable electrodes, the device further including fixed fingers extending along the transverse axis such that each of the plurality of movable fingers extending from the beam is disposed between a pair of fixed fingers, the fixed fingers forming the respective first and second electrodes.

3. The device of claim 1, further comprising a demodulator having an input lead for receiving a signal from the movable electrode, and an output lead for providing a demodulated signal, the demodulator sampling between closings of the reset switch at least once during a first half cycle of the periodic signal and at least once during a second half cycle of the periodic signal.

4. The device of claim 3, further comprising a generator coupled to the first and second electrodes for providing the first and second periodic signals as square waves so that the movable electrode provides a square wave in response to the movement of the movable electrode, the demodulator sampling the output square wave at least once at a high value of the square wave and once at a low value of the square wave.

5. The device of claim 4, further including an amplifier coupled between the movable electrode and the demodulator so that the signal received by the demodulator is amplified.

6. The device of claim 3, further including an amplifier coupled between the movable electrode and the demodulator so that the signal received by the demodulator is amplified.

7. A method for use with a differential capacitor having first and second outer electrodes, and an inner electrode, the method comprising the steps of:

(a) receiving, by the first outer electrode a first periodic signal;

(b) receiving, by the second outer electrode, a second periodic signal, the second periodic signal having approximately the same minimum voltage, maximum voltage, and period T as the first periodic signal and being approximately 180° out of phase with respect to the first periodic signal; and (c) receiving by the inner electrode a DC voltage signal to periodically reset the DC voltage of the inner electrode synchronized with the periodic signals.

8. The method of claim 7, wherein steps (a) and (b) include receiving square waves that transition at times t=0, T/2, T, 3T/2, etc.

9. The method of claim 8, wherein step (c) includes receiving a DC voltage that has a magnitude approximately midway between the minimum and maximum voltages of the square waves.

10. The method of claim 7, further comprising the step of:

(d) sampling the amplitude of the signal on the inner electrode at least once during a first half period of the periodic signals and once during a second half period of the periodic signals to obtain a peak-to-peak amplitude.

11. The method of claim 10, wherein at least one sample taken during the first half period and one sample taken during the second half period are taken between successive resets.

12. The method of claim 10, wherein step (c) includes receiving a pulse of short duration relative to T at times t1, t1+nT, t1+2nT, etc., with 0<t1<T/2.

13. The method of claim 12, wherein step (d) includes taking a first demodulator reading at times t1, t1+T, t1+2T, etc., and taking a second demodulator reading at times t1+T/2, t1+3T/2, t1+5T/2, etc.

14. The method of claim 7, wherein step (c) includes receiving a pulse of short duration relative to T at times t1, t1+nT, t1+2nT, etc., with 0<t1<T/2.

15. A method for use with a surface micromachined sensor having a movable mass elongated along a first direction, with fingers extending transverse to the first direction and away from the mass to form movable electrodes, and a plurality of stationary fingers forming first and second groups of fixed electrodes, wherein each movable electrode is between a fixed finger in the first group and a fixed finger in the second group to form a differential capacitor, the method comprising the steps of:

(a) providing to the first group of fixed electrodes a first periodic signal;

(b) providing to the second group of fixed electrodes a second periodic signal, the second periodic signal having approximately the same minimum voltage, maximum voltage, and period T as the first periodic signal and being approximately 180° out of phase with respect to the first periodic signal; and (c) periodically providing to the movable mass a fixed DC voltage signal to reset a DC voltage of the movable mass when the DC voltage signal is provided, the fixed DC voltage signal being provided so that it is synchronized with the periodic signals.

16. The method of claim 15, wherein step (c) includes providing a DC voltage that has a magnitude approximately midway between the minimum and maximum voltages of the square waves.

17. The method of claim 15 wherein steps (a) and (b) include providing square waves that transition at times t=0, T/2, T, 3T/2, etc.

18. The method of claim 15, wherein step (c) includes providing a pulse of short duration relative to T at times t1, t1+nT, t1+2nT, etc., with 0<t1<T/2.

* * * * *